US005369427A

United States Patent [19]

Itaya et al.

[11] Patent Number: 5,369,427

[45] Date of Patent: Nov. 29, 1994

[54] ELECTROSTATIC RECORDING HEAD

[75] Inventors: Masahiko Itaya; Hiroyuki Nakagoshi; Tsutomu Sasaki, all of Tokyo, Japan

[73] Assignee: Nippon Steel Corporation, Tokyo, Japan

[21] Appl. No.: 29,649

[22] Filed: Mar. 11, 1993

[30] Foreign Application Priority Data

Mar. 13, 1992 [JP] Japan .................................. 4-089411
Mar. 13, 1992 [JP] Japan .................................. 4-089412

[51] Int. Cl.$^5$ .............................................. G01D 15/06
[52] U.S. Cl. ...................................................... 346/159
[58] Field of Search ........................ 346/154, 155, 159

[56] References Cited

U.S. PATENT DOCUMENTS

| | | | |
|---|---|---|---|
| 4,538,163 | 8/1985 | Sheridon | 346/159 X |
| 4,584,592 | 4/1986 | Tuan et al. | 346/159 |
| 4,658,275 | 4/1987 | Fujii et al. | 346/154 |
| 4,823,284 | 4/1989 | Ward | 346/154 |
| 4,899,186 | 2/1990 | Walcott | 346/159 |

FOREIGN PATENT DOCUMENTS 238070 2/1990 Japan .

*Primary Examiner*—George H. Miller, Jr.
*Attorney, Agent, or Firm*—Pollock, Vande Sande & Priddy

[57] ABSTRACT

The electrostatic recording head includes an air introducing path for introducing an air, an ion exhaust path, an array of a large number of pin electrodes provided near the ion exhaust path within the air introducing path, an opposing electrode disposed opposite to the pin electrode array so that when a predetermined voltage is applied to the pin electrodes, corona discharge is caused between the pin electrodes and the opposing electrode, thereby ionizing the introduced air, and an array of control electrodes for selectively controlling flow of the ionized air through the ion exhaust path.

20 Claims, 4 Drawing Sheets

ELECTROSTATIC RECORDING HEAD

FIELD OF THE INVENTION

This invention relates to an electrostatic recording head, and particularly to an electrostatic recording head for use in ion flow type electrostatic recording apparatus.

BACKGROUND OF THE INVENTION

FIG. 9 shows an example of the conventional ion flow type electrostatic recording head which is described in, for example, Japanese Patents JP-A-59-164,154, JP-A-59-190854 and JP-A-2-38070. Referring to FIG. 9, an ion generator is formed of one elongated discharge wire 51 and a metal shield 52 surrounding the discharge wire 51. The metal shield provides an opposite electrode to the discharge wire. This shield 52 has an ion exhaust path 53 and a compressed air introducting path 54. In the ion exhaust path 53, a control electrode head is provided. The control electrode head has a large number of elongated parallel electrodes 55 extending toward the ion exhaust path 53. When a DC high voltage of 5 to 7 kV is applied to the discharge wire 51, corona discharge occurs between the discharge wire 51 and the shield 52, causing discharge of a large amount of ions from the circumference of the discharge wire. The produced ions are introduced into the ion exhaust path together with the compressed air. On the other hand, an image control voltage of 50 to 100 V is selectively applied to the control electrodes 55 so that from among the ions introduced into the ion exhaust path, those ions existing near the electrodes 55 to which the control voltage is applied are passed through the ion exhaust path and projected toward a recording medium 56 by the electric field produced by the electrodes, while those ions existing near the electrodes 55 to which the control voltage is not applied are prevented from passing through the ion exhaust path. Thus, an electrostatic latent image is formed on the recording medium 56 in accordance with the distribution of those control electrodes 55 to which the control voltage is applied.

However, the conventional recording head involves a problem such that because of the presence of a strong electric field in the ion generating section, dust (chiefly. $SiO_2$) in air, for example, is deposited on the discharge wire which is provided in the ion generating section, resulting in irregular discharge and leak of discharge. In other words, the ion generation by using the discharge wire involves a problem of poor durability.

In addition, in the ion generation using the discharge wire, corona discharge radially occurs toward the shield around the ion generating section, so that ions are diffused. Thus, the ions generated by discharge are not efficiently drawn out from the ion exhaust path. Particularly in case of high speed image production where much ion flow is required, this problem is more serious.

SUMMARY OF THE INVENTION

Accordingly, it is an object of the present invention to provide an electrostatic recording head capable of preventing non-uniform discharge distribution and discharge leak due to deposition of foreign substance like dust to the discharge electrode, thereby achieving continuous generation of uniform discharge.

It is another object of the invention to provide an electrostatic recording head capable of improving the efficiency in introducing the ions generated from the ion generating section into the ion exhaust path.

In order to achieve the above objects, according to one aspect of the present invention, an electrostatic recording head comprises an air introducing path for introducing an air, an ion exhaust path, an array of a large number of pin electrodes provided near the ion exhaust path within the air introducing path, an opposing electrode disposed to opposite to the pin electrode array so that when a predetermined voltage is applied to the pin electrodes, corona discharge is caused between the pin electrodes and the opposing electrode, thereby ionizing the introduced air, and an array of control electrodes for selectively controlling flow of the ionized air through the ion exhaust path.

According to another aspect of the present invention, an electrostatic recording head comprises an air introducing path for introducing an air, an ion exhaust path, an array of a large number of pin electrodes provided near the ion exhaust path within the air introducing path, the pin electrodes projecting in a direction substantially the same as a direction in flow of the introduced air, an opposing electrode disposed opposite to the pin electrode array so that when a predetermined voltage is applied to the pin electrodes, corona discharge is caused between the pin electrodes and the opposing electrode, thereby ionizing the introduced air, and an array of control electrodes for selectively controlling flow of the ionized air through the ion exhaust path.

In the electrostatic recording head according to the first aspect of the invention, since an array of a large number of pin electrodes is used, the exposed portions of the pin electrodes in the ion generating section can be much reduced in size as compared with the conventional discharge wire, and thus the dust in the compressed air which is introduced into the ion generating section is hardly deposited on the pin electrodes. In addition, even if dust is deposited on one pin electrode, the adjacent pin electrodes with no dust deposited can generate ions by discharge, thus assuring the ion flow sufficient to form an electrostatic latent image. Therefore, the ion flow can be stably supplied from the ion generating section, thereby improving the continuity of the discharge.

Moreover, in the electrostatic recording head according to the other aspect of the invention, since the pin electrodes of the pin electrode array are extended in a direction substantially the same as a direction in flow of the introduced air, the ions can be efficiently exhausted from the ion exhaust path. Thus, the ion flow can be stably supplied at a high efficiency from the ion generating section to the recording medium, thereby enabling the high-speed image recording.

DESCRIPTION OF THE PREFERRED EMBODIMENTS

The first embodiment of the invention will be described with reference to FIGS. 1 to 4.

Figure 1:
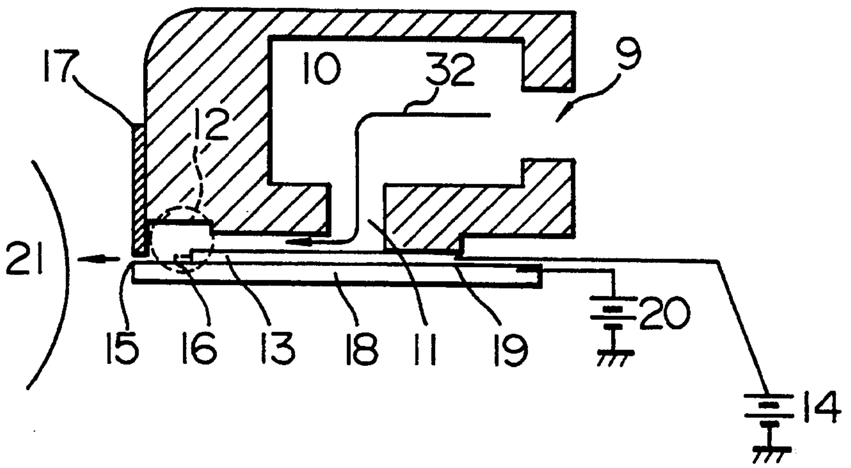
FIG. 1 is a cross-sectional view of an electrostatic recording head according to one embodiment of the invention.
Figure 2:
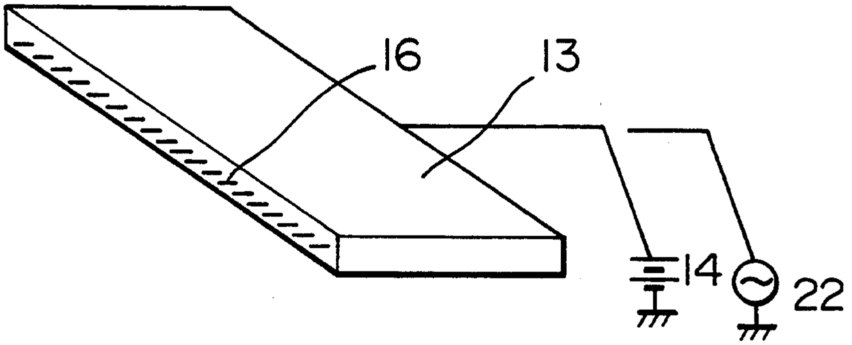
FIG. 2 is a perspective view of the pin electrode array of FIG. 1.

FIG. 1 is a diagram showing the structure of the electrostatic recording head according to the first embodiment of the invention, and FIG. 2 is a perspective view of the discharge electrode 13.

The air fed into an air flow inlet 9 is compressed within an air reservoir 10 made of a metal or resin. The compressed air is introduced through an air introducting path 11 into an ion generating section 12 as indicated by an arrow 32. In the prior art, the discharge wire 51 was provided within the ion generating section 12, but in this embodiment, an array 13 of pin electrodes 16 is provided within the ion generating section 12. These pin electrodes 16 are relatively densely arranged at equal intervals in the longitudinal direction of the electrostatic recording head (in a direction perpendicular to the drawing sheet). The pin electrodes are connected to a DC voltage source 14 of 5 to 7 kV. When a voltage is applied between the pin electrodes 13 and an opposing metal shield 17 or an electrode opposing the pin electrodes, corona discharge is caused between each electrode 16 of the pin electrode array 13 and the opposing shield 17, thus ionizing the surrounding air. The generated ions are blown by the compressed air into an ion exhaust path 15. The direction of the corona discharge is substantially the same as that of the air flow 32.

Figure 3:
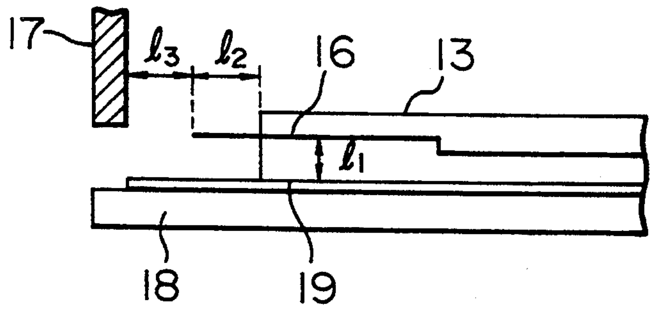
FIG. 3 is a diagram showing a positional relationship between the pin electrode array and the control electrode array in FIG. 1.
Figure 4:
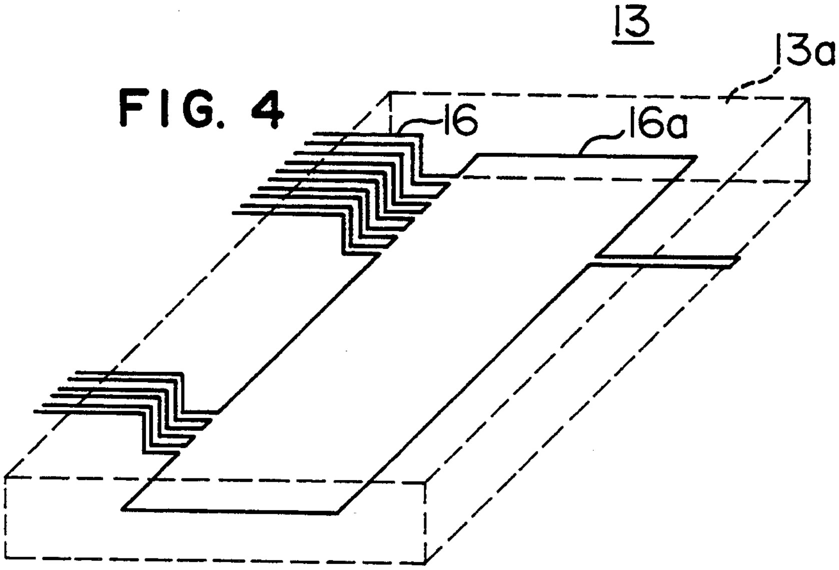
FIG. 4 is a perspective view of the pin electrode array in FIG. 1.

The pin electrode array 13, as shown in FIGS. 3 and 4, is formed of a metal plate 16*a* and a great number of elongated wire-like pin electrodes 16 which are projected from the metal plate 16*a*. This pin electrode array 13 is also embedded in a ceramic, glass or resin insulating block with the tips of the pin electrodes slightly projected out of the block.

The tips of the pin electrodes 16 of the pin electrode array 13 are projected from the block by a distance $l_2$ of about 0.1 to 2 mm. This structure is effective to stabilize the corona discharge. When a discharge test was performed while varying a distance $l_3$ between the pin electrodes 16 and the opposing shield 17 from 3 to 10 mm, stable discharge was obtained when the distance $l_3$ was set at 5 mm. This distance is variable depending on the voltage of the DC voltage source 14.

In addition, when an AC output of an AC voltage source 22 is superimposed to the DC output of the DC voltage source 14 and the superimposed voltage is applied to the pin electrode array 13 as shown in FIG. 2, the stable region of the discharge is widened, and the irregularity of discharge is greatly reduced.

In order to obtain a discharge toward the ion exhaust path 15, the pin electrode array 13 is arranged such that a thin insulating layer 19 of a high resistance is provided on the control electrode 18, and the tips of the pin electrodes 16 are separated by 5 mm from the opposing shield 17. In addition, the distance between each of the pin electrodes 16 and the control electrode 18 is set at about 0.1 to 2 mm if the thickness of the insulating layer 19 is neglected.

The opposing shield 17 opposite to the pin electrode array 13 is preferably made of stainless steal, not of aluminum because an insulating aluminum oxide film is formed on the aluminum surface when the shield is exposed to the chemical reaction of corona discharge for a long time, so that the controllability of the ion flow becomes poor.

A DC voltage 20 is selectively applied to a great number of control electrodes of the control electrode array 18, producing an electric field by which the ion current is controlled in the ion exhaust path 15. The ion current passed through the ion exhaust path under the control of the control electrodes 18 is blown onto the recording medium 21 by the compressed air so that an electrostatic latent image is formed thereon by ions. The structure of the control electrode array is the same as that of the prior art.

As compared with the prior art in which discharge irregularity generally occurs after 5000 copies of A-4 size, the electrostatic recording head of this embodiment is able to produce 20,000 copies of the same size under stable discharge and with uniform electrostatic latent images due to the provision of the pin electrode array in the ion generating section.

Figure 5:
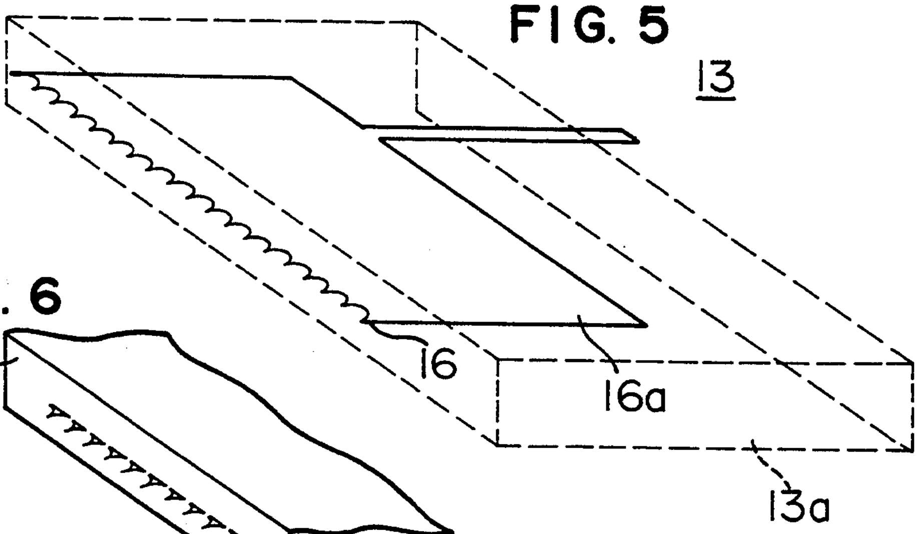
FIG. 5 is a diagram showing a modification of the pin electrodes array according to the present invention.
Figure 6:
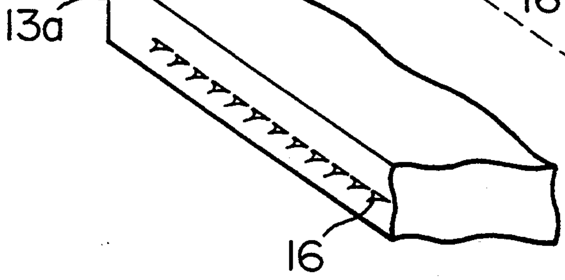
FIG. 6 is a perspective view showing an external appearance of the pin electrode array of FIG. 5.

FIGS. 5 and 6 show a modification of the pin electrode array 13. In this modification, the pin electrodes 16 have triangular tips provided in place of the long pin electrodes shown in FIG. 4. As shown in FIG. 6, the pin electrode array 16*a* is embedded within the block 13*a* with the triangular tips projected out of the block.

Figure 7:
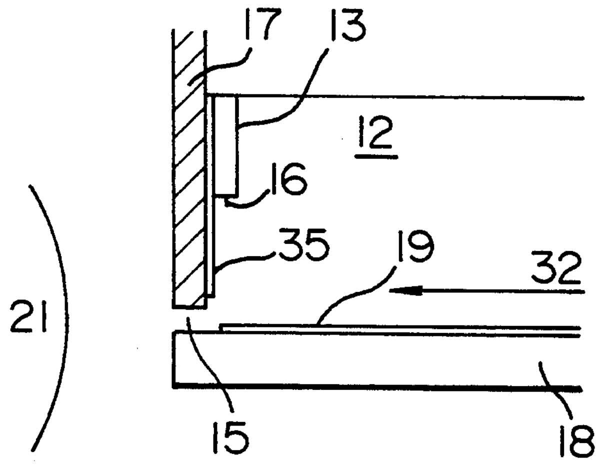
FIG. 7 is a cross-sectional view of a main part of the electrostatics recording head according to another embodiment of the invention.

Another embodiment of the invention will be described with reference to FIG. 7. This embodiment is the same as the embodiment of FIG. 1 except for an arrangement of the pin electrode array and the opposing electrode. In this embodiment, as shown in FIG. 7, an insulating layer 35 is provided on the shield 17 within the ion generating section 12, and the pin electrode array 13 is disposed on this insulating layer. The pin electrode array may be any one of the pin electrode arrays shown in FIGS. 2 to 6. On the other hand, a flat conductor 19 having an insulating layer formed on its rear side is provided as the opposing electrode on the control electrode array 18. The tips of the pin electrodes of the pin electrode array are separated by 5 mm from the opposing electrode so that corona discharge occurs from the pin electrodes toward the opposing electrode 19. The direction of the corona discharge is substantially perpendicular to the flow 32 of the compressed air.

Figure 8:
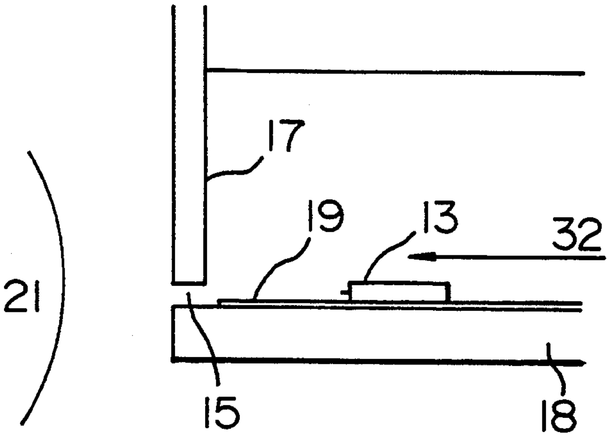
FIG. 8 is a cross-sectional view of a main part of the electrostatic recording head according to still another embodiment of the invention.
Figure 9:
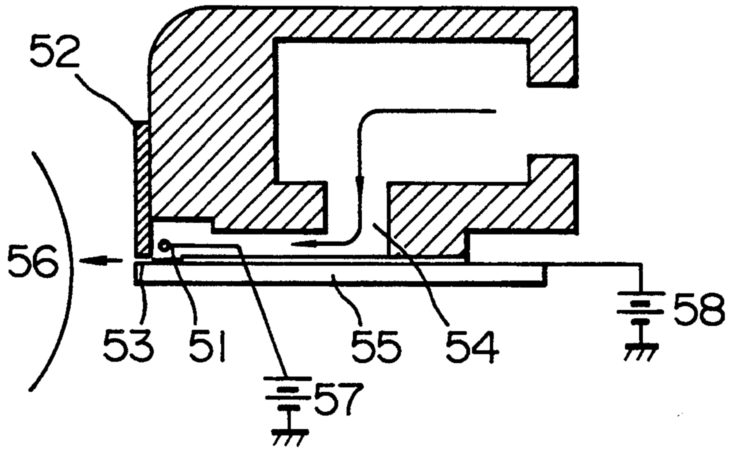
FIG. 9 PRIOR ART
FIG. 9 is a cross-sectional view of a conventional electrostatic recording head.

FIG. 8 shows another arrangement. In order that the discharge is directed toward the ion exhaust path 15, the pin electrode array 13 is disposed on the control electrode array 18 with an insulating layer 19 interposed therebetween. The shield 17 is used as the opposing electrode, and the shield 17 is separated by 5 mm from the tips of the pin electrodes of the pin electrode array. The compressed air is directed toward the ion exhaust path 15 in parallel to the control electrode as indicated by an arrow 32. Corona discharge is generated between the pin electrodes 16 and the opposing electrode in the same direction as that of the air flow.

Thus, when the pin electrode array 13 is disposed on the control electrode 18 and the compressed air flows toward the ion exhaust path 15 in a direction parallel to the control electrode 18, the output current at the recording medium 21 due to the ion flow is as much as 200 nA/cm, which is sufficient to produce an image at a high speed. Particularly when the discharge from the pin electrodes occurs in a direction substantially the same as that of the compressed air flow 32 toward the ion exhaust path as shown in FIG. 8, the efficiency in utilization of the ions can be much increased.

The corona discharge is caused by applying the DC voltage of DC voltage source 14 and/or the AC voltage of AC voltage source 22 to the pin electrode array 13 and the opposing electrode (the conductor 19 in FIG. 7 or the opposing shield 17 in FIG. 4). The ion current is controlled by the electric field which is produced by applying the DC voltage of the control voltage source 20 to the control electrode 18. The ion flow passed through the control electrode 18 is blown onto the recording medium 21 together with the compressed air so that an electrostatic latent image is formed by the ions.

In the embodiments shown in FIGS. 7 and 8, the amount of the ion flow passing through the ion exhaust path is increased 1.5 times by improving the positional arrangement of the discharge electrode. As a result, high-speed image production can be realized, the amount of air flow can be decreased, and the structure of the whole electrostatic recording head can be made smaller.

According to the embodiments mentioned above, since the positional arrangement of the pin electrode array is improved thereby increasing the amount of ion flow passing through the ion exhaust path, the electrostatic recording head of the invention is able to produce latent images at a high speed.

We claim:

1. An electrostatic recording head comprising:
- an air introducing path for introducing an air;
- an ion exhaust path communicating with said air introducing path;
- a pin electrode array provided near said ion exhaust path within said air introducing path, said pin electrode array being formed of an insulating member and a plurality of pin electrodes embedded into the insulating member with tips of the pin electrodes projecting about 0.1 to 2 mm outside of the insulating member;
- an opposing electrode disposed at 3 to 10 mm from the tips of said pin electrodes opposite to said pin electrode array so that when a predetermined control voltage is applied to said pin electrodes, corona discharge is caused between said pin electrodes and said opposing electrode, thereby ionizing said introduced air; and
- an array of control electrodes for selectively controlling flow of said ionized air through said ion exhaust path.

2. An electrostatic recording head according to claim 1, wherein said control voltage is a DC voltage on which an AC voltage is superimposed.

3. An electrostatic recording head according to claim 1, wherein each of said pin electrodes is formed in an elongated wire-like shape.

4. An electrostatic recording head according to claim 1, wherein a tip of each of said pin electrodes is formed in a triangular shape.

5. An electrostatic recording head according to claim 1, wherein said opposing electrode is disposed at 5 mm from the tips of said pin electrodes.

6. An electrostatic recording head comprising:
- an air introducing path for introducing an air;
- an ion exhaust path;
- a pin electrode array provided near said ion exhaust path within said air introducing path, said pin electrode array having an insulating member and a plurality of pin electrodes projecting 0.1 to 2 mm outside of the insulating member in a direction substantially the same as that of said introduced air flow;
- an opposing electrode disposed at 3 to 10 mm from the tips of said pin electrodes opposite to said pin electrode array so that a predetermined control voltage is applied to said pin electrodes, corona discharge is caused between said pin electrodes and said opposing electrode, thereby ionizing said introduced air; and
- an array of control electrodes for selectively controlling flow of said ionized air through said ion exhaust path.

7. An electrostatic recording head according to claim 6, wherein said control voltage is a DC voltage on which an AC voltage is superimposed.

8. An electrostatic recording head according to claim 6, wherein each of said pin electrodes is formed in an elongated wire-like shape.

9. An electrostatic recording head according to claim 6, wherein a tip of each of said pin electrodes is formed in a triangular shape.

10. An electrostatic recording head comprising:
- an air introducing path for introducing an air;
- an ion exhaust path;
- ion producing means provided between said air introducing path and said ion exhaust path, and including a pin electrode array formed of an insulating member and a plurality of pin electrodes embedded into the insulating member with tips of the pin electrodes projecting 0.1 to 2 mm outside of the insulating member and an opposing electrode provided at 3 to 10 mm from the tips of said pin electrodes opposite to said electrode array so that when a predetermined voltage is applied to said pin electrodes, corona discharge is caused between said pin electrodes and said opposing electrode in a direction substantially the same as that of said introduced air flow; and
- an array of control electrodes for selectively controlling flow of said ionized air through said ion exhaust path.

11. An electrostatic recording head according to claim 10, wherein said control voltage is a DC voltage on which an AC voltage is superimposed.

12. An electrostatic recording head according to claim 10, wherein each of said pin electrodes is formed in an elongated wire-like shape.

13. An electrostatic recording head according to claim 10, wherein a tip of each of said pin electrodes is formed in a triangular shape.

14. An electrostatic recording head comprising:
- an air introducing path for introducing an air;
- an ion exhaust path;
- a pin electrode array provided near said ion exhaust path with said air introducing path, said pin electrode array being formed of an insulating member and a metallic plate with a plurality of pin electrodes extending from said metallic plate, said metallic plate being embedded into the insulating member with tips of the pin electrodes projecting 0.1 to 2 mm outside of the insulating member;

an opposing electrode disposed at 3 to 10 mm from the tips of said pin electrodes opposite to said pin electrode array so that when a predetermined control voltage is applied to said pin electrodes, corona discharge is generated between said pin electrodes and said opposing electrode, thereby ionizing said introduced air; and an array of control electrodes for selectively controlling flow of said ionized air through said ion exhaust path.

15. An electrostatic recording head according to claim 14, wherein said metallic plate and said pin electrodes are integrally formed into one piece.

16. An electrostatic recording head according to claim 14, wherein said control voltage is DC voltage on which an AC voltage is superimposed.

17. An electrostatic recording head according to claim 14, wherein each of said pin electrodes is formed in an elongated wire-like shape.

18. An electrostatic recording head according to claim 14, wherein the tip of each said pin electrodes is formed in a triangular shape.

19. An electrostatic recording head according to claim 14, wherein said opposing electrode is disposed at 5 mm from the tips of said pin electrodes.

20. An electrostatic recording head for generating a latent image on a recording medium, said recording head comprising:

an air introducing path for introducing an air;

ion producing means for ionizing the air introduced through said air introducing path thereby generating ionized air;

an ion exhaust path provided so as to direct the ionized air toward the recording medium disposed at a position separated from said ion exhaust path; and an array of control electrodes for selectively controlling flow of said ionized air toward the recording medium;

wherein said ion producing means comprises:

a pin electrode array provided near said ion exhaust path within said air introducing path, said pin electrode array being formed of an insulating member and a plurality of pin electrodes embedded into the insulating member with tips of the pin electrodes projecting outside of the insulating member;

an opposing electrode disposed between said pin electrode array and the recording medium opposite to said pin electrode array so that when a predetermined control voltage is applied to said pin electrodes, corona discharge is caused between said pin electrodes and said opposing electrode, thereby ionizing said introduced air.

* * * * *